US010482330B2

(12) United States Patent
Buschmann et al.

(10) Patent No.: US 10,482,330 B2
(45) Date of Patent: Nov. 19, 2019

(54) THERMOGRAPHIC MODULE FOR PAVERS

(71) Applicant: JOSEPH VOEGELE AG, Ludwigshafen/Rhein (DE)

(72) Inventors: Martin Buschmann, Neustadt (DE); Henning Delius, Hanhofen (DE); Arnold Rutz, Ludwigshafen (DE)

(73) Assignee: JOSEPH VOEGELE AG, Ludwigshafen/Rhein (DE)

( * ) Notice: Subject to any disclaimer, the term of this patent is extended or adjusted under 35 U.S.C. 154(b) by 491 days.

(21) Appl. No.: 14/817,823

(22) Filed: Aug. 4, 2015

(65) Prior Publication Data

US 2016/0042235 A1 Feb. 11, 2016

(30) Foreign Application Priority Data

Aug. 5, 2014 (EP) ...................... 14179811

(51) Int. Cl.
*G06K 9/00* (2006.01)
*G01J 5/02* (2006.01)
(Continued)

(52) U.S. Cl.
CPC .......... *G06K 9/00791* (2013.01); *E01C 19/02* (2013.01); *E01C 19/48* (2013.01);
(Continued)

(58) Field of Classification Search
CPC .. G06K 9/00791; G01J 5/0859; G01J 5/0066; G01J 5/02; G01J 2005/0081; E01C 19/48;
(Continued)

(56) References Cited

U.S. PATENT DOCUMENTS 4,910,593 A 3/1990 Weil
5,362,176 A * 11/1994 Sovik .................... E01C 19/006
404/72
(Continued)

FOREIGN PATENT DOCUMENTS

CN 102182137 A 9/2011
CN 102691251 A 9/2012
(Continued)

OTHER PUBLICATIONS

Extended European Search Report dated Sep. 9, 2016, Application No. 14 179 811.6-1562, Applicant Joseph Vögele AG, 5 Pages.
(Continued)

*Primary Examiner* — Gims S Philippe
*Assistant Examiner* — Stefan Gadomski
(74) *Attorney, Agent, or Firm* — Brooks Kushman P.C.

(57) ABSTRACT

A system comprising a temperature measurement device for continuously detecting temperature values of a pavement laid by means of a paver. The system further comprises an image recording unit and an evaluation unit. The evaluation unit is configured to determine an area of the laid pavement as a deviation area, if, based on temperature values detected for the area, one or more deviation criteria are fulfilled, wherein the determination is carried out during laying and in temporal proximity to the detection of the temperature values for the area. The system is additionally configured to generate, making use of the image recording unit, an image assigned to the deviation area.

23 Claims, 6 Drawing Sheets

(51) Int. Cl.
  H04N 5/33    (2006.01)
  E01C 19/02   (2006.01)
  G06T 7/00    (2017.01)
  G01J 5/08    (2006.01)
  G01J 5/00    (2006.01)
  E01C 19/48   (2006.01)
  E01C 23/01   (2006.01)

(52) U.S. Cl.
  CPC ............ *E01C 23/01* (2013.01); *G01J 5/0066* (2013.01); *G01J 5/02* (2013.01); *G01J 5/0859* (2013.01); *G06T 7/0004* (2013.01); *H04N 5/33* (2013.01); *E01C 2301/00* (2013.01); *G01J 2005/0077* (2013.01); *G01J 2005/0081* (2013.01); *G06T 2207/30108* (2013.01)

(58) Field of Classification Search
  CPC ....... E01C 19/02; E01C 23/01; G06T 7/0004; H04N 5/33
  See application file for complete search history.

(56) References Cited

U.S. PATENT DOCUMENTS

| | | | |
|---|---|---|---|
| 6,112,903 A * | 9/2000 | Kimmel | G01N 22/00 198/461.2 |
| 6,227,762 B1 | 5/2001 | Van Velsor | |
| 6,749,364 B1 * | 6/2004 | Baker | E01C 19/288 404/118 |
| 7,873,492 B2 | 1/2011 | Ackermann | |
| 8,099,218 B2 | 1/2012 | Glee et al. | |
| 9,255,364 B2 * | 2/2016 | Ichikawa | E01C 19/48 |
| 9,447,549 B2 | 9/2016 | Buschmann et al. | |
| 2002/0175691 A1 | 11/2002 | Sovik et al. | |
| 2004/0264542 A1 | 12/2004 | Kienitz | |
| 2009/0142133 A1 * | 6/2009 | Glee | E01C 19/004 404/75 |
| 2009/0317186 A1 * | 12/2009 | Glee | E01C 19/004 404/75 |
| 2012/0218411 A1 | 8/2012 | Wu et al. | |
| 2014/0086684 A1 * | 3/2014 | Sehr | G01D 21/02 404/84.05 |
| 2014/0347448 A1 * | 11/2014 | Hegemann | G06T 7/90 348/46 |
| 2015/0199576 A1 * | 7/2015 | Ichikawa | E01C 19/48 382/104 |
| 2016/0061755 A1 | 3/2016 | Delius et al. | |
| 2016/0350907 A1 * | 12/2016 | Simula | G06T 7/0004 |

FOREIGN PATENT DOCUMENTS

| | | |
|---|---|---|
| CN | 103292930 A | 9/2013 |
| CN | 104101434 A | 10/2014 |
| DE | 102008058481 A1 | 7/2009 |
| EP | 2634747 A1 | 9/2013 |
| EP | 2 666 908 A1 | 11/2013 |
| JP | 02293685 A | 12/1990 |
| JP | 04077608 U | 7/1992 |
| JP | 6-228911 A | 8/1994 |
| JP | 07042370 U | 8/1995 |
| JP | 2000258584 A | 9/2000 |
| JP | 2005-97958 A | 4/2005 |
| JP | 2005094958 A | 4/2005 |
| JP | 2008-268217 A | 11/2008 |
| WO | 0070150 A1 | 11/2000 |
| WO | 2004034351 A2 | 4/2004 |

OTHER PUBLICATIONS

Extended European Search Report dated Jan. 30, 2015, Application No. 14179811.6-1562, Applicant Joseph Vögele AG, 8 Pages.
European Communication dated May 11, 2015, Application No. 14179811.6-1562, Applicant Joseph Vögele AG, 4 Pages.
Japanese Office Action dated Jun. 28, 2016, Application No. 2015-148419, 4 Pages.
Chinese Search Report dated Jan. 15, 2018, Application No. 2015105323403, 2 Pages.
Chinese First Office Action dated Feb. 1, 2018, Application No. 201510532340.3, Applicant Joseph Voegele AG, 7 Pages.
Extended European Search Report dated Feb. 9, 2015, Application No. 14182526.5-1604, Applicant Joseph Voegele AG, 6 Pages.
European Communication dated Apr. 18, 2016, Application No. 14 182 526.5-1604, Applicant Joseph Voegele AG, 6 Pages.
English Translation of Japanese Office Action dated Sep. 6, 2016, Application No. 2015-157259, Dispatch No. 398496, 3 Pages.
Indian Examination Report dated Feb. 23, 2018, Application No. 2255/DEL/2015, Applicant Joseph Voegele AG, 6 Pages.
Alexandr Vasenev et al., "A real-time system for prediction cooling within the asphalt layer to support rolling operations", 5th Eurasphalt & Eurobitume Congress, Jun. 13-15, 2012, Istanbul, pp. 1-7.
U.S. Final Office Action dated Feb. 1, 2019, U.S. Appl. No. 14/836,274, 21 Pages.
Indian Examination Report dated Mar. 13, 2019, Application No. 2434/DEL/2017, 7 Pages.

* cited by examiner

THERMOGRAPHIC MODULE FOR PAVERS

CROSS-REFERENCE TO RELATED APPLICATIONS

This application claims foreign priority benefits under 35 U.S.C. § 119(a)-(d) to European patent application number EP 14 179 811.6, filed Aug. 5, 2014, which is incorporated by reference in its entirety.

TECHNICAL FIELD

The present disclosure relates to a system comprising a temperature measurement device for continuously detecting temperature values of a pavement laid by means of a paver, and in particular to such a system comprising an image recording unit and an evaluation unit for documenting the detection of the laying temperature.

BACKGROUND

A paver is a machine by means of which unbonded and bonded layers or pavements can be produced. As soon as a laid pavement is made available for its intended use, subsequent improvements entail substantial efforts, such as the closure of road sections or parts of buildings. Hence, quality control is of great importance in the field of asphalt laying. A system which allows the quality of asphalt laying or the quality of the laid asphalt to be measured is shown in WO 2004/034351 A2. In particular, it is possible to manually check the properties of the asphalt, and, in so doing, individual measurement processes can be linked with site data.

As regards causes, especially the processing temperature of the pavements used in road construction, in particular asphalt, is an important process variable which substantially influences the usage properties, such as stability, layer adhesion and service life of the laid pavements. Pavers typically distribute paving material and execute precompacting of a surface of the paving material with a screed, which is attached to the rear end of the paver and drawn thereby. Subsequently, the laid pavement is compacted still further by rollers. Like other factors, such as environmental and weather conditions during laying, the temperature of the material in different stages of the laying process influences the efficiency and the success of a paving job.

Processing e.g., paving material under optimum temperature conditions has long been recognized as important, but such processing often entails manual control measurements on the part of the support and operating staff. Paving material is typically obtained at a comparatively high temperature at an asphalt or bitumen plant. Depending on the distance a supply machine has to travel so as to reach a work site as well as on the traffic and the ambient temperature, the asphalt may cool to a certain extent prior to delivery. In addition, progress of the paving machines and of the compacting machines or rollers may vary. If the whole paving process has slowed down, haul trucks may sometimes have to wait to offload the paving material. The extent of cooling, once the paving material has finally reached the paving machine, may vary depending on the temperature of the paving material at delivery, environmental factors, the use of insulated or non-insulated haul trucks and proper versus improper operation of the paving machine, etc. Ecological and economical aspects, e.g., with respect to the amount of gas consumed at the burner, become here increasingly important. In some cases, paving material may segregate within the paving machine, and thus relatively cooler and relatively hotter pockets or accumulations of material within the machine may exist, leading to unexpected temperature gradients in the paving material once distributed on the work surface. When the paving material has been discharged and distributed by the paving machine or paver, and subsequently been treated by means of the screed, and is then ready to be compacted still further by the various compacting machines, its temperature can vary significantly from an expected temperature and can be non-uniform in temperature from one paved region to the next due to unintended segregation or poor mixing.

Due to the paramount importance of the laying temperature of the pavement, measuring of the laying temperature becomes increasingly important and, within the last few years, various solutions have been developed on the market, which satisfy the demand for metrological proof of the laying temperature and thus facilitate also subsequent improvements. Various systems which measure for this purpose the laying temperature behind the paver, in particular behind the screed, are commercially available. The available systems range from a pyrometer array to thermal or infrared scanners and also to pivotable pyrometers. These systems are used for obtaining a more or less areal impression of the temperature profile behind the paver.

Other systems for obtaining laying temperature information are based on an infrared camera whose image data are arithmetically converted into scanning lines by means of suitable software. These lines are spaced at a defined distance from the trailing edge of the screed, each line representing the temperature profile of the paved layer transversal to the travelling direction of the paver. The software combines the individual lines so as to form a planar image, a temperature map or two-dimensional temperature profile. These images are subsequently used for assessing the temperature distribution of the laid asphalt. As mentioned above, a temperature distribution having the highest possible uniformity is here a quality characteristic, since this will provide uniform preconditions for subsequent compacting by means of rollers.

DE 10 2008 058 481 A1 describes an evaluation of such a temperature profile during the paving process and, in particular, the adaptation of a paving plan for the use of the individual machines of the paving train. Especially on the basis of the temperature information acquired, the distance between the compacting rollers and the paving machine or paver is adapted such that the asphalt will not be processed by the subsequent compacting rollers within a temperature range known as "tender zone", i.e., it will be compacted either above the upper limit temperature or below the lower limit temperature of the temperature range of the tender zone.

WO 00/70150 A1, in turn, deals with a temperature monitoring system for use on a paver, said temperature monitoring system scanning the temperature of the laid pavement line by line in a line scan mode. According to respective embodiments, the information obtained is directly used for an adapted control of the screed or communicated to other machines of the paving train.

These known systems proceed from an idealized detection of the temperature of the laid pavement. In practice, however, it is frequently such that rollers or other machines of the paving train enter the pavement or that individual persons of the operating staff cross it. This may lead to incorrect measurements of the laying temperature, which find expression in a two-dimensional temperature profile or temperature map. The then detected local temperature will be discerned as being, in comparison with the temperature of the surrounding laid pavement, either too low, too high, very inhomogeneous, or as deviating in some other way from the ambient temperature, but subsequently it cannot easily be ascertained whether the reason for this deviation is an inhomogeneity in the laid material, caused e.g., by segregation and pocket formation, or a detection of foreign objects. Furthermore, there may be a malfunction of an infrared camera or of a comparable temperature measurement device used for detecting the laying temperature, so that the actual measuring points of temperature detection lie outside the target area of the laid pavement or the detected image area varies incorrectly between the measurements. If the temperature measurement device is not correctly directed onto the laid pavement, the detected temperature may confront the evaluating staff with unsolvable problems.

SUMMARY

It is therefore an object of the present disclosure to provide a less error-prone system, which is better adapted to practical use and which comprises a temperature measurement device for detecting the laying temperature of a pavement laid by means of a paver.

The disclosure relates to a system comprising a temperature measurement device for continuously detecting temperature values of a pavement laid by means of a paver, an image recording unit and an evaluation unit. The evaluation unit is configured to determine an area of the laid pavement as a deviation area, if, based on the temperature values detected for said area, one or a plurality of deviation criteria are fulfilled. The determination of a deviation area is carried out during laying and in temporal proximity to the detection of the temperature values for said area. The system is configured to generate, making use of the image recording unit, an image assigned to the deviation area, so as to document the detection of the temperature values for the deviation area. The system thus allows a target-oriented detection of relevant points for examination or subsequent improvements and provides, moreover, an improved documentation of the laying process.

In the context of the present disclosure "in temporal proximity" means that determination of a deviation area takes place e.g., within a tenth of a second, within a few tenths of a second, within a second or within a time frame of up to 4 or 5 seconds.

Due to the documentation of temperature value detection precisely for the areas determined as deviation areas, embodiments according to the disclosure allow the temperature information acquired by the continuous temperature measurement to be subjected to informed further processing at the points where deviations from the temperature of the surrounding pavement, from a target temperature or from a target temperature range occur. Prior art measurements of such areas had the effect that these areas were, of necessity, not taken into consideration in more detail or that it was necessary to check each individual one of the identified areas.

Embodiments according to the disclosure allow a more differentiated treatment of imperfections of the laid pavement on the one hand and of incorrect measurements on the other. The deviation areas which, on the basis of the documentation according to the present disclosure, are identified as being not based on the measurement of foreign objects or other incorrect measurements can be purposefully checked with much less effort and, if necessary, improved subsequently. Hence, the disclosure reduces the expenditure of time required for an improved quality level of the laid pavement, and the costs. The laying process can be documented completely for a customer. Problematic points can subsequently be subjected to precise examination.

According to an advantageous embodiment, the image is generated in temporal proximity to the detection of the temperature values, so that the image serves not only for documenting the imperfection as such but especially also for documenting the detection of the temperature values for the deviation area. Advantageously, the deviation criteria are of such a nature that a deviation area will especially be determined, if an incorrect measurement has taken place. Incorrect measurements comprise a detection of the temperature of objects or foreign objects other than the laid pavement. An incorrect measurement may also exist in the case of a malfunction of the paver, e.g., if asphalt laying is discontinued, and/or in the case of a malfunction or an incorrect orientation of the temperature measurement device.

The deviation criteria may comprise relative or absolute lower limits or upper limits or exceptional inhomogeneities in temperature distribution. A strong variance in the temperature values of a comparatively small area may be considered suspicious on the basis of relevant deviation criteria, since the temperature gradients to be expected in the laid pavement are only of a moderate nature.

It will be of advantage to detect the temperature of the laid pavement at a certain distance behind the screed of the paver. This allows a consistent determination of the laying temperature of the pavement with due regard to the effects of the spreading and precompacting of the pavement through the screed.

According to one aspect of the present disclosure, the evaluation unit is configured such that the image is assigned to the deviation area as auxiliary information, and the auxiliary information is stored together with the two-dimensional profile of the laying temperature formed on the basis of the detected temperature values. This allows possible locations necessitating subsequent improvement to be represented, ascertained and tracked in a particularly clear manner.

According to an advantageous embodiment, the system additionally comprises a geoposition detection unit for assigning, especially to a deviation area, a geoposition as auxiliary information. The additional storage of a geoposition for the deviation areas ascertained makes it easier to find the identified imperfections for which a necessity of subsequent improvement is discerned, e.g., on the basis of the images generated.

It will be advantageous to use between specific deviation areas a temporal distance of the line-by-line temperature detection in combination with an ascertained spatial relation, so as to prevent an image or picture from being generated for each outlier or each individual deviation area, and assign, instead, one and the same image to more than one ascertained deviation area. The data volume required for documenting the detection of the laying temperature can thus be limited. The assignment is carried out in an advantageous manner on the basis of a temporal-spatial relationship between two or more deviation areas and additional predefined parameters, which are optionally taken into account and which may represent possible and expected causes for incorrect measurements. The number of the most important causes leading in practice to incorrect measurements due to the crossing of persons or vehicles or other foreign objects is limited in the sphere of pavement laying. This knowledge can be used for efficiently reducing the production and/or storage of assigned images.

According to embodiments, the temperature measurement device comprises a thermal scanner, a pivotable pyrometer, a pyrometer array and/or an infrared camera. The image recording unit advantageously comprises an infrared camera, a combined system of an infrared camera and an optical camera and/or an optical camera. The same infrared camera which is used as a temperature measurement device may also be used for generating the documenting images.

According to a preferred embodiment, the system is configured for storing the detected temperature values line by line, each line representing the temperature profile of the paved layer transversal to the travelling direction of the paver. The image recording unit according to this embodiment is configured for producing as an image an overall image of a section of the laid pavement. This allows an improved classification, in particular an improved recognition or detection of the causative foreign objects and/or of an incorrect orientation. The larger the section of the overall image is the higher the average number of specific deviation areas that can be assigned to a single image will be. On the basis of a suitable compression of the image, this can lead, in total, to a reduction of the data volume accruing.

According to an embodiment, the temperature measurement device and the image recording unit of the system are integrated in a thermographic module, which, with the aid of fixing units, can be mounted on a paver above the screed of the latter or on the roof of a driver's cab of the paver. The integrated mode of arrangement in the same module guarantees a constant relative orientation of the optical axes of the temperature measurement device and of the image recording unit, even under the rough operating conditions of pavement laying.

The present disclosure additionally provides a paver comprising the temperature measurement device and the image recording unit of the system, integrated in a thermographic module in an advantageous manner. The evaluation unit of the system may here be arranged at a location remote from the paver, said evaluation unit being configured for radio communication with the temperature measurement device and the image recording unit. This allows the advantageous use of a central evaluation unit for a plurality of thermographic modules and, consequently, pavers as well as central evaluation and processing and, if necessary, control of the units following in the respective laying process.

Embodiments according to the present disclosure are described with reference to the attached drawings.

DETAILED DESCRIPTION

As required, detailed embodiments are disclosed herein; however, it is to be understood that the disclosed embodiments are merely exemplary and that various and alternative forms are possible. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
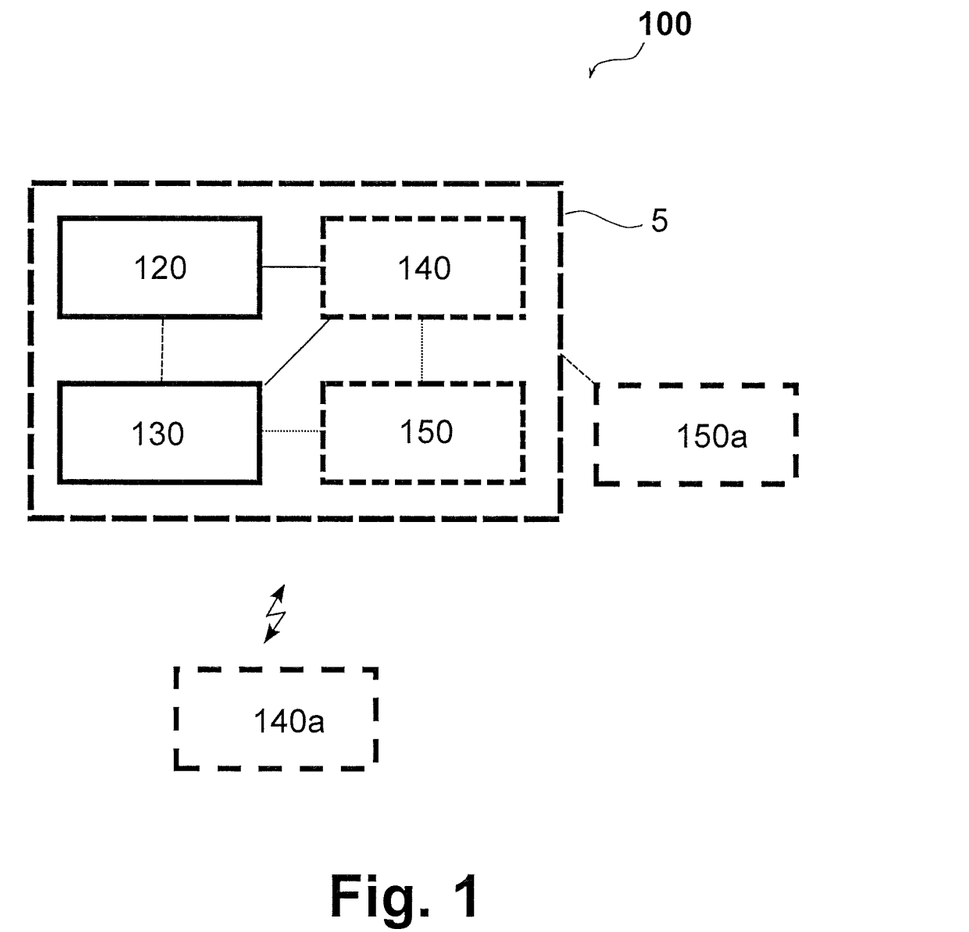
FIG. 1 shows a system according to the present disclosure comprising a temperature measurement device.

FIG. 1 shows a system 100 according to an embodiment of the disclosure. The system 100 comprises a temperature measurement device 120, an image recording unit 130 and an evaluation unit 140, the evaluation unit 140 being in communicative connection with the temperature measurement device 120 and the image recording unit 130, respectively. According to an embodiment, the temperature measurement device 120 and the image recording unit 130 are integrated in a thermographic module 5, which may also comprise the evaluation unit 140. According to another embodiment, an evaluation unit 140a is, however, arranged in spaced relationship with the thermographic module 5, and thus especially with the temperature measurement device 120 and the image recording unit 130, and is in wireless communication with the latter. It is therefore not necessary to provide the processing capacity required for the evaluation unit 140 in the thermographic module 5 itself.

The temperature measurement device 120 preferably comprises an infrared camera, which is capable of operating in a line-by-line scan mode. According to other embodiments, an infrared scanner or thermal scanner, a pivotable pyrometer, a pyrometer deflected via a rotating mirror or a pyrometer array are provided. The image recording unit may comprise an optical camera or an infrared camera or both said cameras. According to an embodiment, the infrared camera of a temperature measurement device may also be used as an image recording unit according to the present disclosure, which generates different images and output signals in accordance with a respective retrieved function. For continuous temperature detection, line-by-line scanning of the pavement will be of advantage, whereas, for generating images in accordance with the present disclosure, it will be advantageous to use overall images of comparatively large areas, which comprise ascertained deviation areas or are assigned to the latter.

The evaluation unit 140 or 140a is configured for determining an area of the laid pavement 3 as deviation area 6, if, based on temperature values detected for said area, one or more deviation criteria are fulfilled. The determination is carried out during laying and in temporal proximity to the detection of the temperature values for said area, and the system 100 is configured for generating, making use of the image recording unit, an image 7 assigned to the deviation area 6.

According to an embodiment, an overall image of comparatively large areas of the laid pavement 3 is generated at predetermined temporal or spatial intervals during temperature detection, and subsequently said overall image is assigned to deviation areas 6. For images 7 for which no deviation area 6 has been determined, the system 100 can generate an erase instruction, which erases the respective image from the memory, whereby the memory capacity required will be limited. Alternatively, the system 100 may be configured for generating only in reaction to the determination of a deviation area 6 an assigned image 7 in adequate temporal proximity, e.g., within a few tenths of a second after the detection of the temperature values of the deviation area 6. Furthermore, a mixed form is provided according to an embodiment, in the case of which section images 7 are generated at regular intervals as well as, in addition, in reaction to the determination of a deviation area 6. Furthermore, units may be provided in a control panel of the paver and/or of the thermographic module 5, on the thermographic module 5 itself or in a preferably mobile operating unit remote from the thermographic module 5, said units allowing the image recording unit to be triggered manually for documenting the laying temperature detection at a desired moment in time.

According to an advantageous embodiment, the evaluation unit 140, 140a may additionally be provided with image recognition faculties, which analyze the images 7 generated and select those images 7 which show predefined and/or non-predefined objects. Non-predefined objects can be identified on the basis of predetermined criteria. These criteria can be adapted by means of a learning process. The knowledge of the fixing position and of the intended orientation of the thermographic module 5 can advantageously be used for said analyzing and selection. On the basis of a comparison between the position of the deviation area 6 and a position of the object or the objects in the assigned image 7, the evaluation unit 140, 140a can advantageously determine whether an imperfection of the laid pavement 3 or the existence of a foreign object at the moment of temperature detection is documented in the image 7, and mark the deviation area 6 accordingly. In a further step, deviation areas 6 and images assigned thereto, which have been determined on the basis of incorrect measurements and/or the existence of foreign objects in the temperature detection area, can be discarded, and only deviation areas having assigned thereto auxiliary information, such as the assigned image and, optionally, an assigned geoposition, can be stored in a non-volatile memory for future use.

Figure 2A:
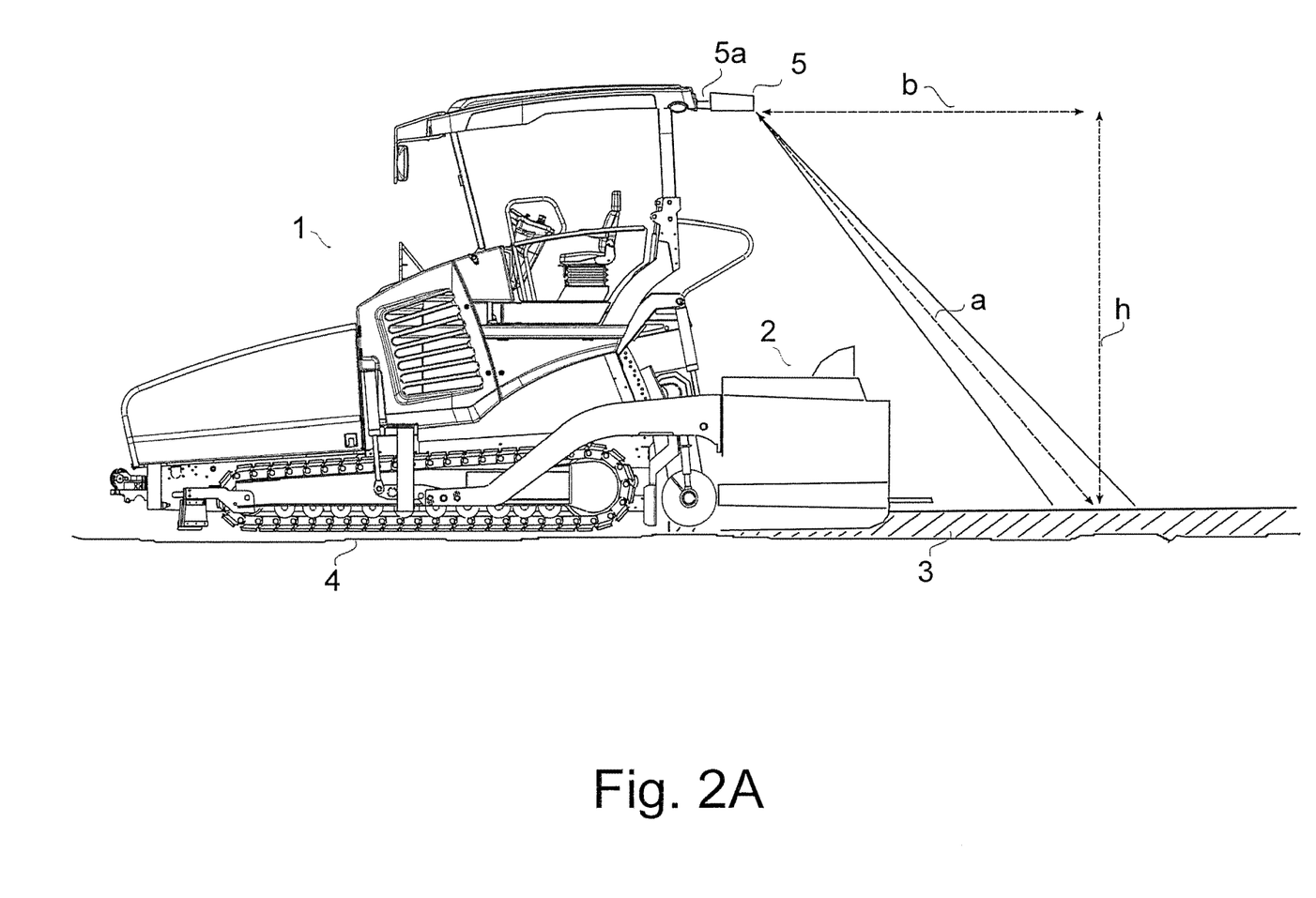
FIG. 2A shows a paver comprising a thermographic module for detecting the laying temperature of the pavement in the laying process.

FIG. 2A shows a paver 1 on a planum 4 during laying of a pavement 3, e.g., asphalt, by means of a screed 2 drawn by the paver 1. In the embodiment shown, the roof of the paver 1 has attached thereto a thermographic module 5 by means of fixing units 5a. The thermographic module 5, which comprises at least the temperature measurement device 120 and the image recording unit 130 of the system 100 according to FIG. 1, is positioned on a level h above the pavement 3 and is configured to detect the temperature of an area of the laid pavement 3 at a distance b behind the thermographic module 5, i.e., corresponding to the height h, at a distance a from the thermographic module 5. Temperature detection may preferably be carried out line by line in a direction transversal to the travelling direction of the paver 1 along the width of the laid pavement 3.

Figure 2B:
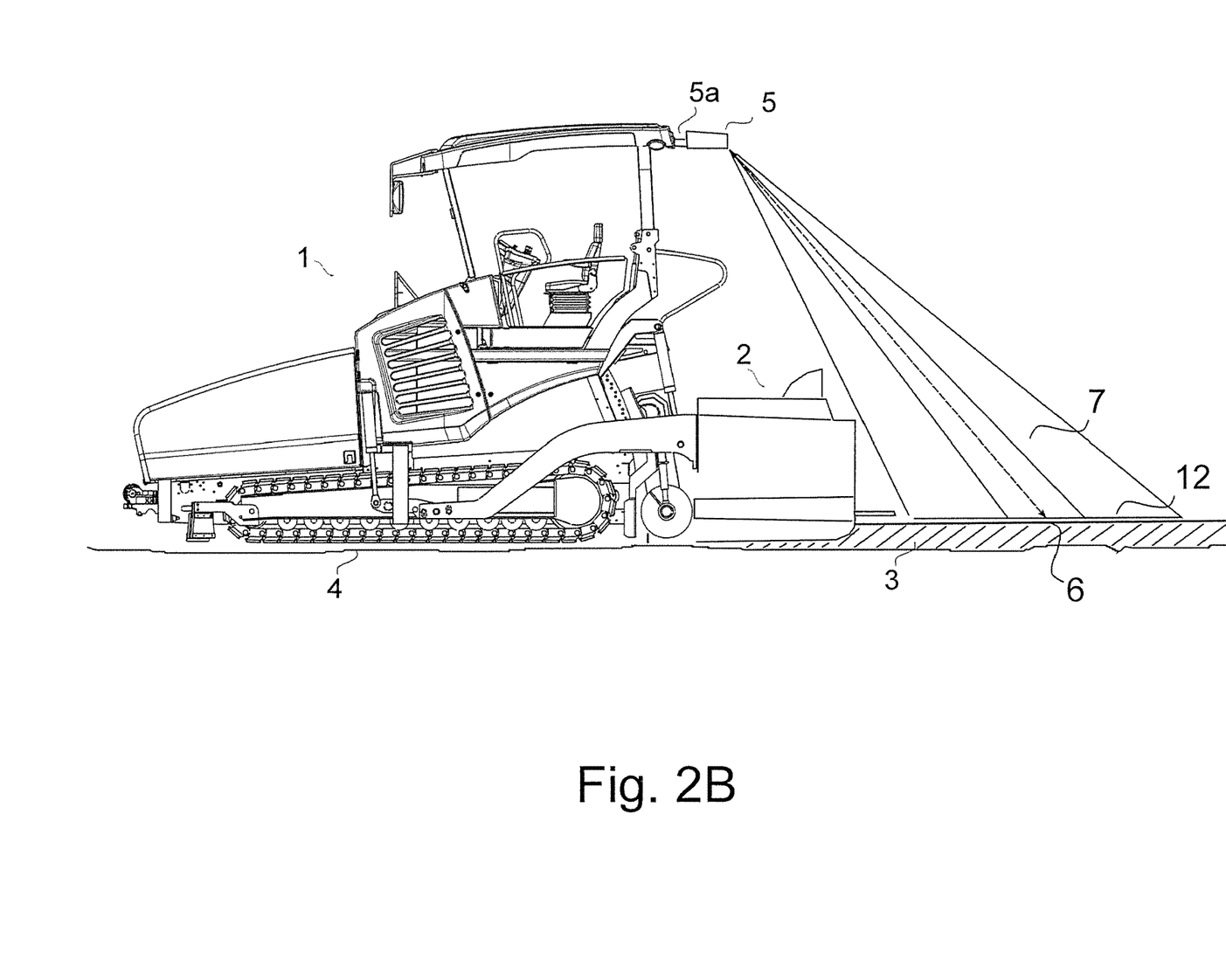
FIG. 2B shows a paver according to FIG. 2A, said figure showing the production of an image for documenting a specific deviation area.

FIG. 2B shows the production of an image 7 for a section 12 of the laid pavement for documenting the detection of the temperature of a deviation area 6 through the thermographic module 5 of a system 100 according to an embodiment of the present disclosure. As stated above, the evaluation unit 140a of the system 100 may also be arranged remote from the paver 1 and, consequently, even remote from the laying process. According to an embodiment, the evaluation unit 140a is an application software, e.g., an app for mobile terminals, e.g., smartphones.

Figure 3A:
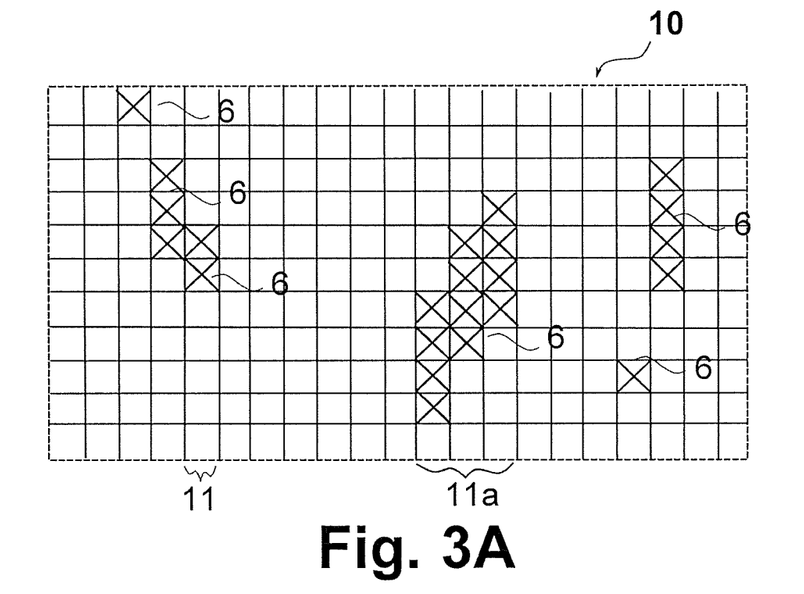
FIGS. 3A and 3B show two-dimensional temperature profiles with specific deviation areas and images assigned thereto.

The lines of temperature values detected behind the paver 1, according to an embodiment behind the screed 2—another possibility being the provision of temperature detection within the screed 2—can be condensed by combining the temperature value information, which has been ascertained line by line, so as to obtain a two-dimensional temperature profile or temperature map 10. In FIG. 3A (and further down also in FIG. 3B), the travelling direction of the paver 1 is from the right to the left.

The area of the temperature profile 10 shown in FIG. 3A corresponds to a number of eleven transversal measuring points of the temperature or to subareas combined in a transversal direction so as to form measuring points. Line-by-line scanning can here be provided either by means of lines 11, which correspond to a measuring point in the travelling direction or are combined to form such a measuring point, or by means of lines 11a exhibiting a spatial resolution of the scanned transversal temperature values into three subareas or three measuring points in the travelling direction.

In the exemplarily shown temperature profile 10, a plurality of areas of the laid pavement have been determined as deviation areas 6. The deviation area 6 ascertained within the line 11a resolved in the travelling direction already corresponds to a two-dimensional area 6 with deviating temperature measurement values, whereas the other deviation areas 6 shown are of a one-dimensional nature and correspond to sections of the respective transversally detected temperature values. According to an embodiment, a deviation area 6 may also be determined such that individual temperature measurement values or small temperature measurement ranges within a deviation area 6 do not fulfil the deviation criteria, the measurement values being, however, nevertheless classified as belonging to a coherent deviation area 6 on the basis of adequately defined superordinate combination criteria.

Figure 3B:
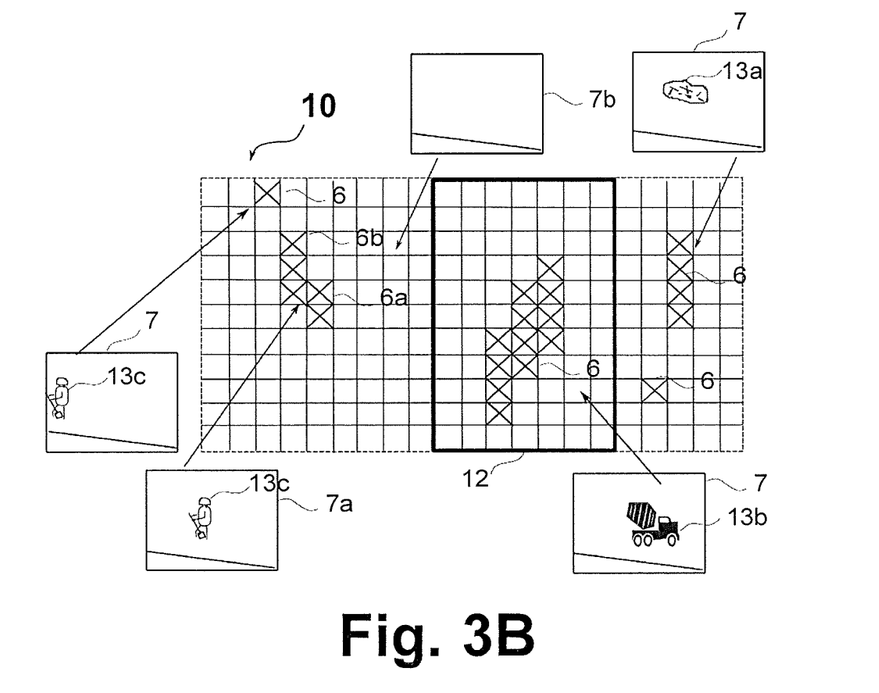

FIG. 3B shows, on the one hand, the causes for the detected imperfections and the determined deviation areas 6, 6a, 6b and, on the other hand, how respective images 7 generated are assigned to the deviation areas 6. In an area whose temperature values do not show any abnormalities, a possibly manually generated image 7b will consequently not show any foreign object. In contrast thereto, image 7 of the deviation area 6 shows with respect to the imperfection 13a an irregularity in the laid pavement, which has been recognized on the basis of deviating temperature values. As regards this imperfection 13a of the paved layer, a check and, if necessary, a subsequent improvement can be carried out later on. The imperfection is thus documented through image 7 of the paved layer imperfection 13a assigned thereto.

Image 7 of section 12 of the laid pavement 3 documents a cause for the deviation in the detected temperature values, which resulted in the determination of a larger deviation area 6. This cause is the crossing of the foreign object 13b and a corresponding detection of the temperature of the foreign object, which, as shown, may be some other vehicle 13b of the paving train, but not an irregularity or deviation of the temperature of the laid pavement 3, e.g., towards higher or lower temperatures, such as a temperature below 70° C.

Also in the left upper area of the section of a temperature profile 10 shown in FIG. 3B, a deviation has been recognized and, accordingly, deviation areas 6a and 6b have been determined whose cause is the detection of the temperature of a person 13c of the paving train staff who is present on the laid pavement. Knowing the time intervals between line detections and taking possibly into account the travelling speed of the paver 1 and/or other parameters, e.g., for defining the dimensions of possible foreign objects, the deviation areas 6a and 6b were identified as belonging to a single foreign object due to the fact that they are arranged in successive lines of temperature detection and were, moreover, detected in spatial proximity, and consequently they were only documented by a single image 7a. However, the deviation area point 6 corresponding to a single measuring point was documented by a new image 7 for the same foreign object, viz. person 13c, since e.g., no sufficient spatial overlap was ascertained. An exemplary cause for this may be that, after having acted upon the laid pavement in the area of the deviation areas 6a and 6b, the person may have rapidly left the asphalt pavement and that, due to the thus larger spatial distance between the line-by-line detected deviation areas, no assignment to the joint image 7a has taken place.

Figure 4:
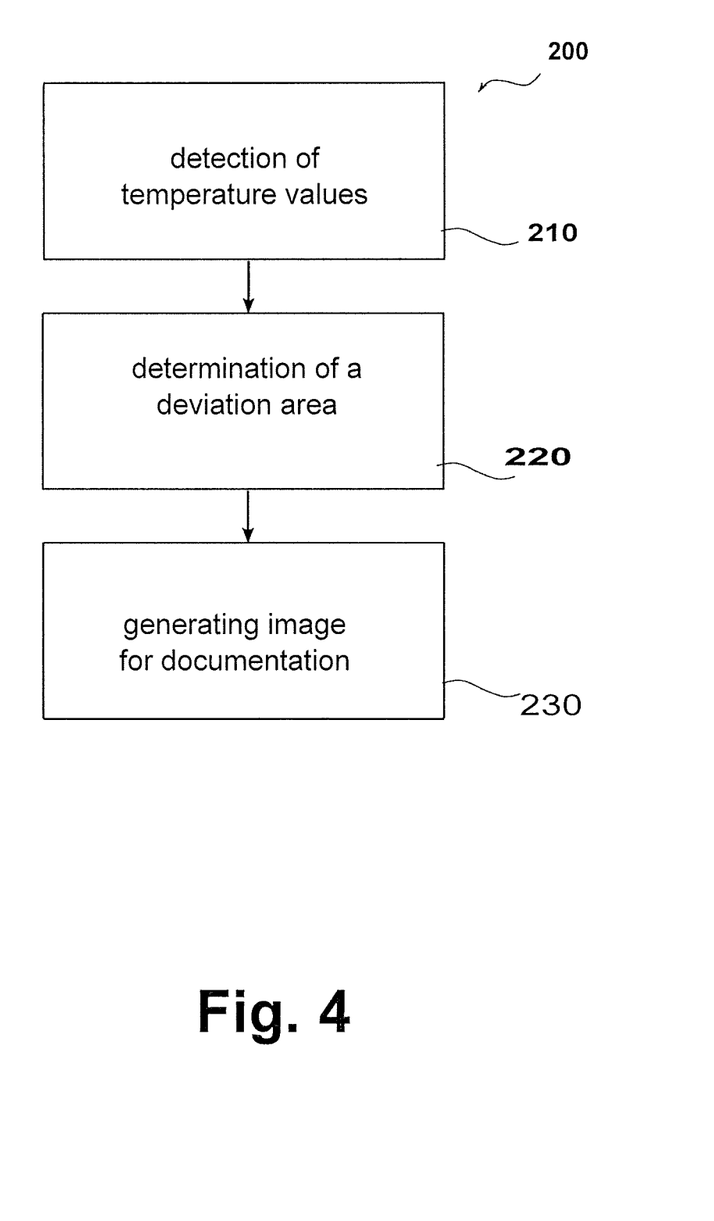
FIG. 4 shows a method for documenting detection of the laying temperature according to an embodiment.

FIG. 4 shows schematically the steps of a method 200 according to the present disclosure for documenting the temperature of the pavement 3 laid by means of a paver 1. In step 210, temperature values of the laid pavement are continuously detected. Detection may here be carried out line by line or iteratively for individual two-dimensional areas. If the detected temperature values for an area fulfil one or more deviation criteria, said area is determined in step 220 as deviation area of the laid pavement. The determination is carried out during laying and in temporal proximity to the respective detection of the temperature values for the area. In step 230, an image 7 assigned to the deviation area is generated for documenting the detection of the temperature values for the deviation area. As explained above, this generation can take place before or after the determination of a deviation area, either at regular time intervals, in reaction to the determination of a deviation area and/or through manual triggering. Accordingly, the sequence of steps 210, 220 and 230 is to be considered non-limiting and should also be understood such that the continuous detection in step 210 continues or starts again after determination and generation in steps 220 and 230.

Figure 5:
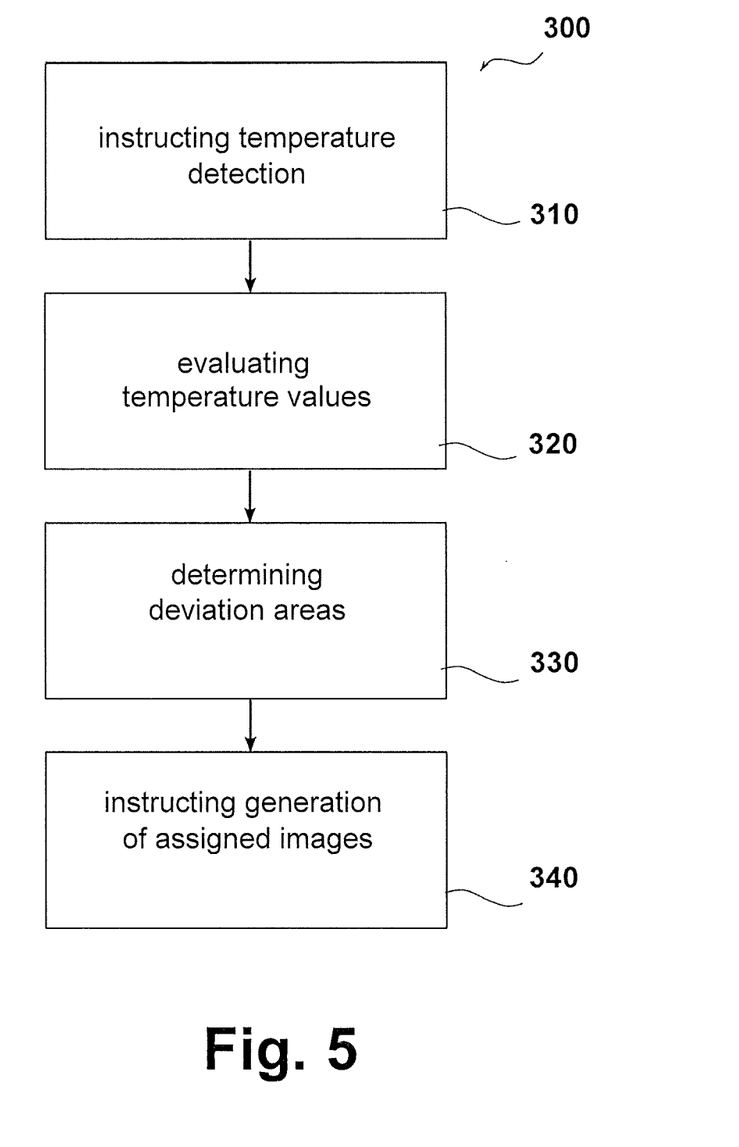
FIG. 5 shows a control method according to an embodiment, carried out when instructions of a computer-readable storage medium are executed.

FIG. 5 shows steps of a control method 300 carried out when computer-executable instructions of a computer-readable storage medium are executed. The computer-aided execution can be carried out through a control device of the system 100 within or on the paver 1 or at a location remote from the paver 1. For the purpose of execution, the evaluation unit 140 or 140a of the above-mentioned embodiments can be provided or a control device or a controlling computer unit, which is in operative communication with the evaluation unit 140, 140a. In step 310 of the control method 300, a temperature measurement device is instructed to continuously detect during a laying process the temperature of the pavement 3 laid by a paver 1. In step 320 the detected temperature values are evaluated during the laying process and in temporal proximity to detection of the temperature values. According to step 330, an area of the laid pavement 3 is determined as deviation area 6, if, based on temperature values detected for said area, one or a plurality of deviation criteria are fulfilled. According to step 340 of the control method, the image recording unit is instructed to generate for a deviation area an assigned image 7 for documenting the detection of the temperature values for said deviation area 6. Said generation may take place prior to the determination of a deviation area 6, e.g., at periodic time intervals, in reaction to the determination of a deviation area 6 and/or as a result of manual triggering.

The methods 200 and 300 may, in accordance with the above specified embodiments of the system 100 and paver 1 according to the present disclosure, be further developed in an advantageous manner. This applies e.g., to the definition of deviation criteria, the line-by-line detection of transversal temperature values, the assignment of one or a plurality of images 7, 7a to one or a plurality of deviation areas 6, 6a and 6b, respectively, the assignment of a geoposition to a deviation area 6 as auxiliary information as well as the storage of auxiliary information consisting of the data of the images 7, 7a and/or the geoposition information data for deviation areas.

Storage can be executed on exchangeable media such as a removable medium or a portable storage medium or the data may be transmitted by radio communication to a server for storage on said server or for storage in a cloud memory. For advantageously limiting a necessary storage capacity, the data may also be buffered in a buffer or in a volatile memory, and an image 7 may only be stored permanently in a non-volatile memory, if there are additional features, such as a confirmation signal sent by an operator of the paver or a control unit and/or the evaluation unit 140, 140a of the system 100. To this end, a screen may be provided on the paver 1 or at a location remote from the paver, said screen communicating with the evaluation unit 140, 140a and/or a control unit of the system 100 and receiving image information therefrom. By means of the screen, an image generated at the time in question can be presented to an operator who can then decide on rejection or storage.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a temperature measurement device configured to continuously detect temperature values of a pavement laid by means of a paver during a pavement laying process;
an image recording unit; and
an evaluation unit configured to determine an area of the laid pavement as a deviation area based on temperature values detected for the area fulfilling one or more deviation criteria, wherein the determination is carried out during the pavement laying process and in temporal proximity to the detection of the temperature values for the area;
wherein the system is configured to generate, making use of the image recording unit, an image assigned to the deviation area, the deviation area is a first deviation area, the evaluation unit is configured to assign the same image to a second deviation area of the laid pavement as auxiliary information, and the evaluation unit is configured to carry out the assignment on the basis of a temporal-spatial relationship between the first and second deviation areas and one or more predefined parameters representing causes for incorrect measurements, and wherein the second deviation area is different than the first deviation area.

2. The system according to claim 1 wherein the system is configured for generating the image in temporal proximity to the detection of the temperature values such that the image serves to document the detection of the temperature values for the deviation area.

3. The system according to claim 1 wherein the deviation criteria are configured such that a deviation area will be determined if an incorrect measurement has taken place that comprises a detection of temperature of objects other than the laid pavement or a malfunction or an incorrect orientation of the paver or of the temperature measurement device.

4. The system according to claim 1 wherein the deviation criteria comprise relative or absolute lower limits, upper limits or inhomogeneities of temperature values.

5. The system according to claim 1 wherein the detected temperature values are laying-process temperature values detected by the temperature measurement device during or after precompacting through a screed of the paver.

6. The system according to claim 1 wherein the evaluation unit is configured for assigning the image to the deviation area as auxiliary information, and the system is configured for storing the auxiliary information together with a two-dimensional profile of laying temperature formed on the basis of the detected temperature values.

7. The system according to claim 1 wherein the temperature measurement device comprises a thermal scanner, a pivotable pyrometer, a pyrometer array or an infrared camera, and the image recording unit comprises an infrared camera or an optical camera.

8. The system according to claim 1 wherein the system is configured for storing the detected temperature values line by line, each line representing a temperature profile of the paved layer transverse to a travelling direction of the paver, and the image recording unit is configured for generating as an image an overall image of a section of the laid pavement.

9. The system according to claim 1 wherein the temperature measurement device and the image recording unit are integrated in a thermographic module, which is mountable on a paver above a screed of the paver.

10. An arrangement comprising:
a paver for laying pavement; and
the system according to claim 1 associated with the paver.

11. The arrangement according to claim 10 wherein the paver includes the system.

12. The arrangement according to claim 10 wherein the paver includes the temperature measurement device and the image re-cording unit of the system, and the evaluation unit of the system is arrangeable at a location remote from the paver and configured to be in radio communication with the temperature measurement device and the image recording unit.

13. A method for documenting detection of temperature of pavement laid by a paver, the method comprising:
detecting continuously or at intervals temperature values of the laid pavement during a pavement laying process;
determining an area of the laid pavement as a first deviation area based on temperature values detected for the area fulfilling one or more deviation criteria, the determination being carried out during the pavement laying process and in temporal proximity to the detection of the temperature values for the area;
generating, with an optical camera, an image assigned to the first deviation area so as to document the detection of the temperature values for the first deviation area; and
associating the image to a second deviation area of the laid pavement as auxiliary information based on a temporal-spatial relationship between the first and second deviation areas and one or more predefined parameters representing causes for incorrect measurements, wherein the second deviation area is different than the first deviation area.

14. A non-transitory computer-readable storage medium with computer-executable instructions, which, when executed, carry out a control method comprising:
instructing a temperature measurement device to continuously or at intervals detect, during a pavement laying process, temperature of pavement laid by a paver;
evaluating detected temperature values during the pavement laying process and in temporal proximity to the detection of the temperature values;
determining an area of the laid pavement as a first deviation area based on temperature values detected for the area fulfilling one or more deviation criteria;
instructing an image recording unit to generate for the first deviation area an assigned image so as to document the detection of the temperature values for the first deviation area; and
assigning the image to a second deviation area of the laid pavement as auxiliary information based on a temporal-spatial relationship between the first and second deviation areas and one or more predefined parameters representing causes for incorrect measurements, wherein the second deviation area is different than the first deviation area.

15. The system according to claim 1 wherein the temporal proximity is a time frame of up to 5 seconds.

16. The system according to claim 15 wherein the evaluation unit is configured to assign the image to the deviation area as auxiliary information, and the system is configured to store the auxiliary information together with a two-dimensional profile of laying temperature formed on the basis of the detected temperature values.

17. The system according to claim 1 wherein the temporal proximity to the detection of the temperature values for the area is within tenths of a second after the detection of the temperature values for the area.

18. The system according to claim 8 wherein the first and second deviation areas are represented in successive lines of stored detected temperature values.

19. The system according to claim 1 wherein the image recording unit comprises an optical camera.

20. The system according to claim 1 wherein the image documents a cause for the first and second deviation areas.

21. A system comprising:
a temperature measurement device configured to continuously detect temperature values of a pavement laid by means of a paver during a pavement laying process;
an image recording unit; and
an evaluation unit configured to determine an area of the laid pavement as a deviation area based on temperature values detected for the area fulfilling one or more deviation criteria, wherein the determination is carried out during the pavement laying process and in temporal proximity to the detection of the temperature values for the area;
wherein the deviation criteria are configured such that a deviation area will be determined when an incorrect measurement has taken place that comprises a detection of temperature of an object other than the laid pavement;
wherein the system is configured to generate, making use of the image recording unit, an image assigned to the deviation area, wherein the deviation area is a first deviation area, the evaluation unit is configured to assign the same image to a second deviation area of the laid pavement as auxiliary information, and the evaluation unit is configured to carry out the assignment on the basis of a temporal-spatial relationship between the first and second deviation areas, and wherein the second deviation area is different than the first deviation area.

22. The system according to claim 21 wherein the object comprises a vehicle or a person.

23. The system according to claim 21 wherein the evaluation unit is further configured to carry out the assignment on the basis of one or more predefined parameters representing causes for incorrect measurements.

* * * * *

UNITED STATES PATENT AND TRADEMARK OFFICE
CERTIFICATE OF CORRECTION

PATENT NO. : 10,482,330 B2
APPLICATION NO. : 14/817823
DATED : November 19, 2019
INVENTOR(S) : Martin Buschmann et al.

Page 1 of 1

It is certified that error appears in the above-identified patent and that said Letters Patent is hereby corrected as shown below:

Column 11, Lines 35-36, Claim 12:
After "temperature measurement device and the image"
Delete "re-cording" and
Insert -- recording --.

Signed and Sealed this
Seventh Day of April, 2020

Andrei Iancu
*Director of the United States Patent and Trademark Office*